Figure 1:
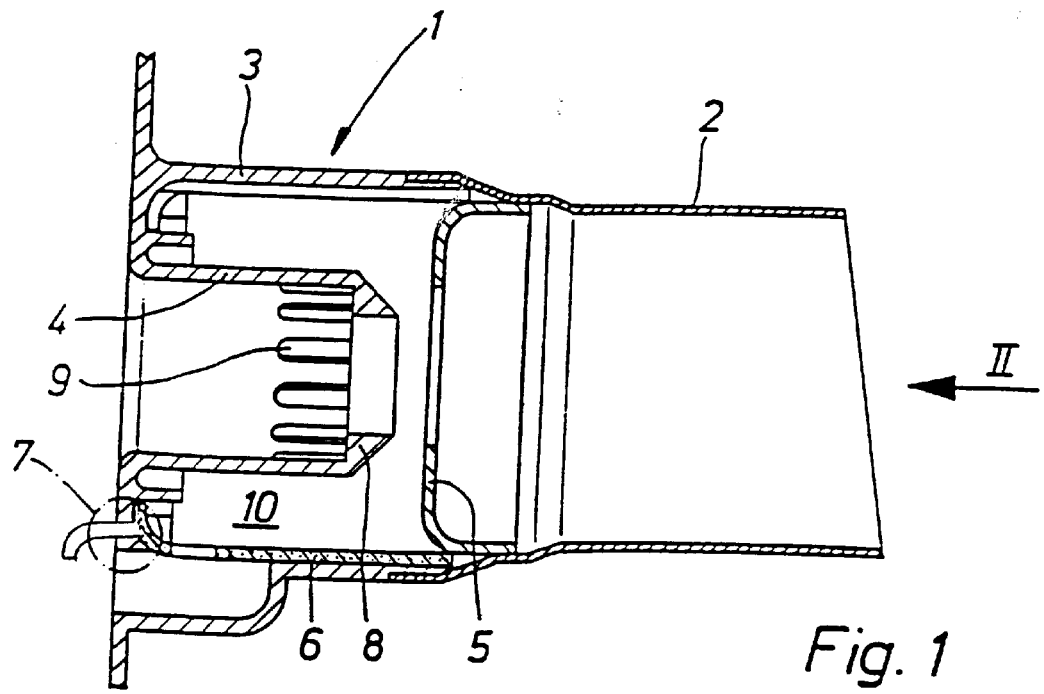

United States Patent
Steiner et al.

[19]

[11] Patent Number: 5,947,717
[45] Date of Patent: Sep. 7, 1999

[54] VAPORIZING COMBUSTION CHAMBER FOR A HEATER RUNNING ON LIQUID FUEL

[75] Inventors: Peter Steiner, Aichwald; Michael Humburg, Göppingen, both of Germany

[73] Assignee: J. Eberspächer GmbH & Co., Esslingen, Germany

[21] Appl. No.: 08/875,325

[22] PCT Filed: Jul. 2, 1996

[86] PCT No.: PCT/DE96/01221

§ 371 Date: Jun. 16, 1997

§ 102(e) Date: Jun. 16, 1997

[87] PCT Pub. No.: WO97/03853

PCT Pub. Date: Feb. 6, 1997

[30] Foreign Application Priority Data

Jul. 14, 1995 [DE] Germany ............ 295 11 384 U

[51] Int. Cl.⁶ .................. F23D 14/46; F24C 3/00; B60H 1/02
[52] U.S. Cl. ............ 431/350; 431/328; 431/338; 431/248; 431/260; 431/353; 126/91 A; 126/116 R; 126/95; 237/12.3 C; 237/32
[58] Field of Search .................. 431/350, 248, 431/249, 338, 260, 261, 262, 326, 328, 331, 333, 353, 8, 9; 126/116 R, 95, 96, 91 A; 237/12.3 C, 28, 32

[56] References Cited

U.S. PATENT DOCUMENTS

| | | | |
|---|---|---|---|
| 2,368,179 | 1/1945 | Turpin | 431/333 |
| 2,636,554 | 4/1953 | Young | 431/338 |
| 3,176,750 | 4/1965 | Downs | 431/260 |
| 4,611,985 | 9/1986 | Panick | 126/95 |
| 4,624,631 | 11/1986 | Kobayashi et al. | 431/350 |
| 4,678,431 | 7/1987 | Widemann et al. | 431/326 |
| 5,197,871 | 3/1993 | Yamamoto et al. | 431/262 |
| 5,647,739 | 7/1997 | McDonald | 431/353 |
| 5,707,227 | 1/1998 | Langen et al. | 431/461 |

FOREIGN PATENT DOCUMENTS

| | | |
|---|---|---|
| 0 287 923 A1 | 10/1988 | European Pat. Off. . |
| 1 291 491 | 3/1969 | Germany . |
| 43 28 790 A1 | 3/1995 | Germany . |
| 195 29 994 A1 | 5/1996 | Germany . |

*Primary Examiner*—Ira S. Lazarus
*Assistant Examiner*—Josiah Cocks
*Attorney, Agent, or Firm*—McGlew and Tuttle, P.C.

[57] ABSTRACT

A vaporizing combustion chamber for a heater running on liquid fuel, in particular a vehicle heater, in which inter alia two pipes disposed concentrically one inside the other form therebetween an annular chamber which is closed at a first end. At the second end, the annular chamber is open and leads into a flame diaphragm which projects radially inwards from the outer pipe and is located at a spacing in front of the inner pipe. At both its ends the inner pipe is substantially open and the opening at the second end is contracted by a concentric baffle edge of a baffle plate. In order to improve the emission values of the combustion chamber exhaust gas and reduce combustion noises both when the combustion chamber is disposed horizontally and when it is disposed vertically, the opening in the flame diaphragm is eccentric to the opening, in the inner pipe, formed by the baffle edge of the baffle plate. The radially larger wall surface of the flame diaphragm is in the vicinity of the fuel-introduction point on the periphery.

9 Claims, 1 Drawing Sheet

VAPORIZING COMBUSTION CHAMBER FOR A HEATER RUNNING ON LIQUID FUEL

The present invention pertains to a vaporizing chamber for a heater operated with liquid fuel, especially a vehicle heater, according to the preamble of patent claim 1.

The emission levels of the waste gas of the combustion chamber are poor and disturbing combustion-related noises are generated due to the circumferential, punctiform admission of the fuel into the fuel-air mixing space of the combustion chamber. This equally applies to the horizontal and vertical operating positions of the combustion chamber, and in the case of a horizontal operating position, the fuel is usually admitted in an area that is not located under a horizontal plane extending through the axis of the combustion chamber. The point of fuel admission is always vertically at the top in the case of combustion chambers arranged vertically.

The object of the present invention is to eliminate the above-described drawbacks. This object is accomplished by a design of the combustion chamber according to the characterizing features of patent claim 1.

Advantageous embodiments are the subject of the subclaims.

The present invention is based on the idea of improving the combustion and consequently the emission and noise behavior of a heater equipped with a combustion chamber of this class by a clever design and guidance of the combustion chamber flame into the combustion chamber flame tube. Experiments carried out within the framework of the present invention revealed that various eccentric positions of a flame orifice opening of equal area lead to considerably different emission and noise levels. The most favorable extent of eccentric arrangement of the opening and its position on the circumference can be readily determined experimentally for a certain combustion chamber configuration of this class.

Different eccentricities may be optimal depending on whether the operating position of the combustion chamber is vertical or horizontal and whether the fuel is admitted in the zenith or at the axial height of the combustion chamber in the case of a horizontal chamber, or whether the fuel is admitted into a vertical chamber. This also applies to the circumferential position of the center of eccentricity.

If the same combustion chamber is intended for vertical and horizontal installation and for different levels of the point of fuel admission in the case of horizontal installation, the extent of the eccentricity and the position on the circumference from the center of the eccentricity, which are optimal for predetermined, different operating positions, can be determined as a compromise by simple experiments.

One exemplary embodiment of the present invention is shown in the drawings.

Figure 2:
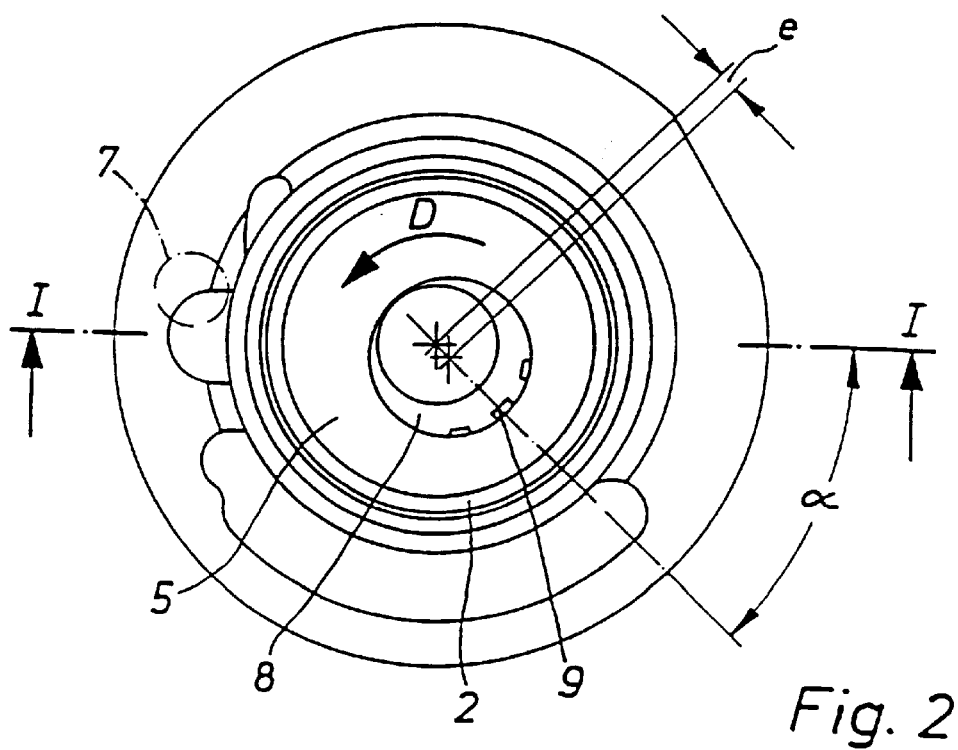

In the drawings,

FIG. 1 shows a longitudinal section through a combustion chamber along line I—I in FIG. 2, and FIG. 2 shows a view of the combustion chamber according to arrow II in FIG. 1.

The combustion chamber comprises a fuel-air-mixing and ignition space area 1 and a flame tube 2 joining downstream of the ignited mixture.

The area 1 is formed by an outer tube 3 and an inner tube 4 located concentrically in same, as well as by a flame orifice 5, by which the flame tube 2 is connected to the area 1.

The annular space located between the outer tube 3 and the inner tube 4 is closed at the end located opposite the flame orifice 5. The inner wall of the outer tube 3 is lined with a porous, absorbent body 6. Liquid fuel, e.g., diesel fuel, is admitted into the said absorbent body 6 at a point of admission 7 indicated by a dash-dotted circle. The ignition at the start of the burner takes place in the area of this point of admission.

The combustion air is fed into the inner tube 4 through the open end of the said inner tube 4 that is located opposite the flame orifice 5. The air flows into the inner tube 4 in a swirling flow. The inner tube 4 is provided with a baffle plate 8 at its end facing the flame orifice. Directly adjoining the said baffle plate 8, radially open, axial slots 9, which extend over about one third of the overall length of the inner tube 4, are located in the jacket of the inner tube 4. Due to the combustion air being admitted as a swirling flow through the inner tube 4, the combustion air penetrates into the mixing space area of the combustion chamber, which extends around the inner tube 4 and is formed essentially by an annular space 10 between the outer and inner tubes 3 and 4, through the slots 9, on the one hand, and through the opening of the baffle plate 8. The igniting flame is formed in the area between the baffle plate 8 and the flame orifice 5 during the continuous operation of the burner in order to subsequently develop completely within the flame tube 2.

The opening of the flame orifice 5 is a circular surface arranged eccentrically to the axis of the combustion chamber. The eccentric offset of the center of the flame orifice opening is in a direction by which the wall area of the flame orifice 5, which joins the point of fuel admission 7, is enlarged. This can be clearly seen in FIG. 2. The position of the combustion chamber shown in FIG. 2 corresponds to a horizontal operating position with a point of fuel admission 7 located approximately at the axial level. The center of the opening of the flame orifice is rotated circumferentially vertically downward by about 45° in relation to the representation in FIG. 2. With such a position of the opening of the flame orifice 5, it was possible to observe a compromise in the experiments carried out with respect to good emission and combustion noise levels for different installation positions of the combustion chamber. The operating positions suitable for this are the installation position shown in FIG. 2, as well an installation position in which the point of fuel admission 7 is at the top in the zenith, as well as a vertical installation position with the flame tube located vertically at the bottom.

In the specific example shown, the outer diameter of the flame orifice is about 45 mm, and the diameter of the opening of the flame orifice is 20 mm. With a flame orifice 5 of such a size, the eccentricity found to be optimal is e=2 mm, and the rotation of the center of the orifice opening in relation to a horizontal plane shown in FIG. 2, which intersects the axis of the combustion chamber, is about at α=45°.

In the case of the combustion chamber according to the example shown, the combustion air is admitted into the inner tube 4 with a swirl in the direction of arrow D.

We claim:

1. A vaporizing combustion chamber comprising:
    an outer tube with a first and second end;
    an inner tube positioned concentrically with said outer tube, said inner tube defining open first and second ends, said inner tube also defining a plurality of slots adjacent said second end of said inner tube, said inner and outer tubes defining an annular space between said inner and outer tubes, said annular space being closed at a first end adjacent said first end of said inner tube, said annular space being open at a second end adjacent said second end of said inner tube;

a baffle plate connected to said open second end of said inner tube, said baffle plate defining an axial opening reducing a size of said open second end, said inner tube guiding combustion air from said first open end of said inner tube through said inner tube and partly through said slots and partly through said axial opening;

a flame orifice wall extending radially inward from said second end of said outer tube and spaced from said second end of said inner tube, said flame orifice wall defining a flame orifice opening positioned eccentrically to said axial opening of said baffle plate, said flame orifice wall having an enlarged radial section;

a porous absorbent body connected to an inner surface of said outer tube;

fuel admission means for admitting fuel to said porous absorbent body in a punctiform manner at a locally limited point of admission adjacent to said first end of said outer tube and said radially enlarged section of said flame orifice wall;

a flame tube positioned adjacent said flame orifice wall for receiving a flame from said flame orifice opening.

2. A vaporizing combustion chamber in accordance with claim 1, wherein:

said second end of said inner tube and said flame orifice wall define a radial gap;

said inner tube guiding the combustion air in a swirled pattern through said inner tube.

3. A vaporizing combustion chamber in accordance with claim 1, wherein:

a radial distance is formed between an edge of said flame orifice opening and an outer edge of said second end of said inner tube due to said flame orifice opening being positioned eccentrically, said radial distance having a direction angularly spaced up to substantially 45 degrees from a line including said point of fuel admission and an axis of the combustion chamber in a plane extending at right angles to said axis of the combustion chamber.

4. A vaporizing combustion chamber in accordance with claim 3, wherein:

a minimum radial distance between said edge of said flame orifice opening and said outer edge at said second end of said inner tube is substantially zero.

5. A vaporizing combustion chamber in accordance with claim 1, wherein:

a minimum radial distance between an edge of said flame orifice opening and an outer circumference at said second end of said inner tube is substantially zero.

6. A vaporizing combustion chamber in accordance with claim 1, wherein:

a maximum radial distance is formed between an edge of said flame orifice opening and an edge of said axial opening due to said flame orifice opening being positioned eccentrically to said axial opening, said maximum radial distance having a direction angularly spaced less than substantially 45 degrees from a line including said point of fuel admission and an axis of said inner tube.

7. A vaporizing combustion chamber in accordance with claim 6, wherein:

said angular spacing is in a plane extending at right angles to said axis of said inner tube.

8. A vaporizing combustion chamber in accordance with claim 6, wherein:

a length of a minimum radial distance between said edge of said flame orifice opening and said edge of said axial opening is substantially zero.

9. A vaporizing combustion chamber in accordance with claim 1, wherein:

a length of a minimum radial distance formed between an edge of said flame orifice opening and an edge of said axial opening due to said flame orifice opening being positioned eccentrically to said axial opening is substantially zero.

* * * * *